United States Patent [19]
Brouwer et al.

[11] 3,882,893
[45] May 13, 1975

[54] FLUID OPERABLE BINARY CONTROL SYSTEM WITH DIAGNOSTIC INDICATORS

[75] Inventors: Charles William Brouwer, East Greenwich; Larry Clyde Cowan, Saunderstown, both of R.I.

[73] Assignee: Leesona Corporation, Warwick, R.I.

[22] Filed: Apr. 9, 1973

[21] Appl. No.: 349,634

[52] U.S. Cl. ............... 137/557; 137/596.15; 91/35
[51] Int. Cl. ...................... F01k 13/02; F16k 37/00
[58] Field of Search .......... 137/820, 821, 829, 831, 137/832, 552, 557; 91/35; 235/201 ME

[56] References Cited
UNITED STATES PATENTS

| | | | |
|---|---|---|---|
| 3,016,918 | 1/1962 | Wentworth | 138/596.15 |
| 3,080,887 | 3/1963 | Brandenberg | 137/596.14 |
| 3,335,950 | 8/1967 | Tal et al | 235/201 ME |
| 3,433,257 | 3/1969 | Jensen | 235/201 ME |
| 3,540,477 | 11/1970 | Hogel | 235/201 ME |
| 3,550,630 | 12/1970 | Panissidi | 91/35 |
| 3,613,505 | 10/1971 | Bubula | 91/35 |
| 3,651,643 | 3/1972 | Hurrah | 137/557 X |
| 3,688,414 | 5/1972 | Koehlinger et al. | 35/13 |
| 3,768,521 | 10/1973 | Brychta et al. | 137/832 |

*Primary Examiner*—William R. Cline
*Attorney, Agent, or Firm*—Albert P. Davis; Burnett W. Norton

[57] ABSTRACT

Pulse actuated binary fluid responsive logic elements are connected in a control system for a fluid flow network operating a fluid responsive mechanism. The logic elements are interconnected to respond to a trigger pulse and automatically sequence through a cycle of operation sensing and responding to fluid pressure conditions at control points in the flow network. A portion of the control points are monitored with diagnostic binary pressure indicators to indicate the status of the network during the control sequence by display of binary words. For correcting malfunctions a comparison chart indicates the nature of invalid words and the corresponding procedure for correcting the malfunctions sensing that word structure, thereby expediting servicing by semi-skilled personnel without detailed knowledge of the system operation.

24 Claims, 5 Drawing Figures

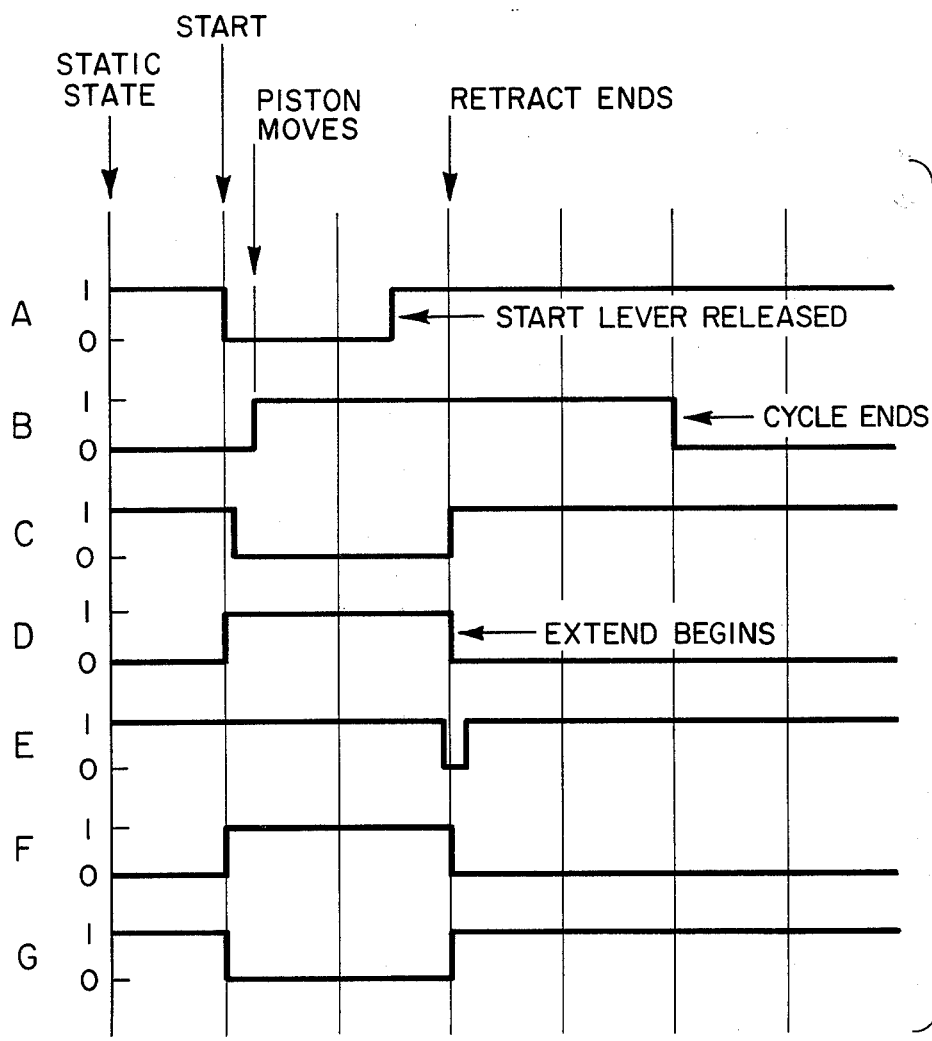

FLUID OPERABLE BINARY CONTROL SYSTEM WITH DIAGNOSTIC INDICATORS

This invention relates to fluid operated binary digital control systems following automatic cyclic sequences controlled by logic elements, and more particularly it relates to control and diagnosis of fluid flow and pressure conditions through a multiple path network through a common network for sequencing and for powering a mechanism through an operating cycle under control of a signal pulse sequence initiated by a trigger pulse.

PRIOR ART STATUS AND PROBLEMS

Control systems for operation of mechanisms through a control cycle by means of sequentially controlled phases triggered by a start pulse have long been known in the electronic arts where complex logic systems are used to cycle and sequence mechanisms through corresponding cycles not feasible by purely mechanical means. While these are successful in many applications, their use is restricted by interfacing problems where there is incompatibility between electrical logic elements or signals and the mechanical operations to be controlled. For example, the delivery of electrical power at a multiplicity of points in a control network requires interface conversion operational elements such as electrical motors or heaters or solenoids to effect such controls, resulting in inefficient, expensive complex and incongruous systems where the mechanisms and logic control system are separate systems operating in different modes. Particularly if fluid controls such as pneumatic are necessary it is difficult and inefficient with known prior art devices to convert from electric control elements and systems to the required fluid responsive elements and systems.

Furthermore, in such cases since the control of the mechanisms is not directly done by the logical elements, expensive supplemental control elements are required and furthermore any diagnosis of system conditions or malfunctions therein by means of indicators on the logic elements cannot identify failures in the mechanism sequence or control elements. Thus, these prior art systems tend to be inefficient requiring not only a diagnosis of the logic element status but also additional indications of the status and operation conditions of the interfacing devices and the mechanism itself. In many cases complex indications are required such as analog levels of temperature and motor speed. Thus, it is difficult to assemble a few pertinent binary diagnostic signals that will clearly and precisely indicate the nature of malfunction in the prior art control systems.

OBJECTS, FEATURES AND ADVANTAGES OF THE INVENTION

It is therefore a general object of this invention to provide improved pulse operated binary logic control systems and correct the aforesaid deficiencies of prior art control systems.

A more specific object of the invention is to provide pulse operated logic control systems compatible with fluid responsive elements and systems.

A further object of the invention is to provide improved efficient control systems that simultaneously operate mechanisms with common and compatible logic elements.

Another object of the invention is to provide improved efficient binary digital diagnostic indicators in control systems for clearly and precisely indicating the nature of malfunctions for both the logic network and the mechanisms controlled thereby.

In general, it is desirable to operate digital logic systems exclusively on a binary basis indicating no more than two logic levels, which can be sensed simply by on-off type indicators and control inputs. The present system therefore is fluid operated by a source such as compressed air and responds to two logic (and working power) levels, namely fluid at either atmospheric pressure or at a predetermined source pressure above atmospheric. Logically, gating and venting of fluid at a single source pressure is employed in a network of fluid flow paths and controlled by fluid operated binary logical elements. Thus, fluid flow and pressure conditions are controlled by logical elements through various network paths and working power is delivered simply and efficiently to many network points through the logical elements at times compatible with any desired control cycle or power sequence to a wide range of compatible fluid driven mechanism such as hydraulic or pneumatic rams, valves, machine elements, sensors of mechanism position and the like, exemplified in an embodiment of the invention hereinafter described.

A logical control device that may be universally employed in such systems as a valve, gate, decision or memory device comprises a simple inexpensive sandwich element having two hollow housing members embracing therebetween a flexible diaphragm. This diaphragm is positioned by differential of fluid pressure on opposite sides to block or open fluid flow paths and thus operates as a valve. The housing members may each have one or more apertures for input or output of fluid on the respective sides of the diaphragm to thereby control the diaghragm or be controlled by it to thereby pass fluid at working or atmospheric pressure under control of pulsed fluid pressure conditions previously exerted on the diaphragm. Thus the elements comprise pulse operated memory elements that will respond to one control pulse to retain a condition until a subsequent control pulse is provided. Depending upon the pressure input combinations and the nature of the apertures such elements can make decisions, store control conditions and amplify or control high power to a load in response to temporary low power trigger pulses.

Thus, by binary digital control of fluid pressures and flow paths at predetermined positions in a fluid flow network by said logic elements, cyclic sequences may be instituted for one or more power utilization devices in a simple, efficient, compatible, compact control system interconnection which replaces mechanical interfaces and mechanical elements in many cases, and operates in a single fluid path control mode. The system logic may thereby automatically progress through a predetermined control sequence cycle established by changes in pressure conditions and flow paths through a fluid flow path network terminating in control of power to at least one fluid operated mechanism.

Illustrative of the nature of the control systems introduced by this invention is a pneumatic control system for selectively operating on command a pneumatic piston through a single reciprocation cycle by use of a few fluid operated logical control elements to gate air above atmospheric pressure from a supply source to operate the piston and the logic control elements over the required reciprocation cycle in response to a single command signal pulse initiating the cycle. A plurality of pressure responsive binary diagnostic indicators is connected in the flow network at predetermined positions providing binary information that can be identified with particular instructions to relatively unskilled maintenance personnel for correcting or diagnosing operations and malfunctions. Thus, a distinct binary word type response may be developed identifying each different operating step, and invalid words are accompanied by a set of specified conditions for correcting malfunctions causing the invalid word.

Further features, advantages and objectives of the invention will be found throughout the following detailed description of the invention made with reference to the accompanying drawing.

THE DRAWING

Figure 2:
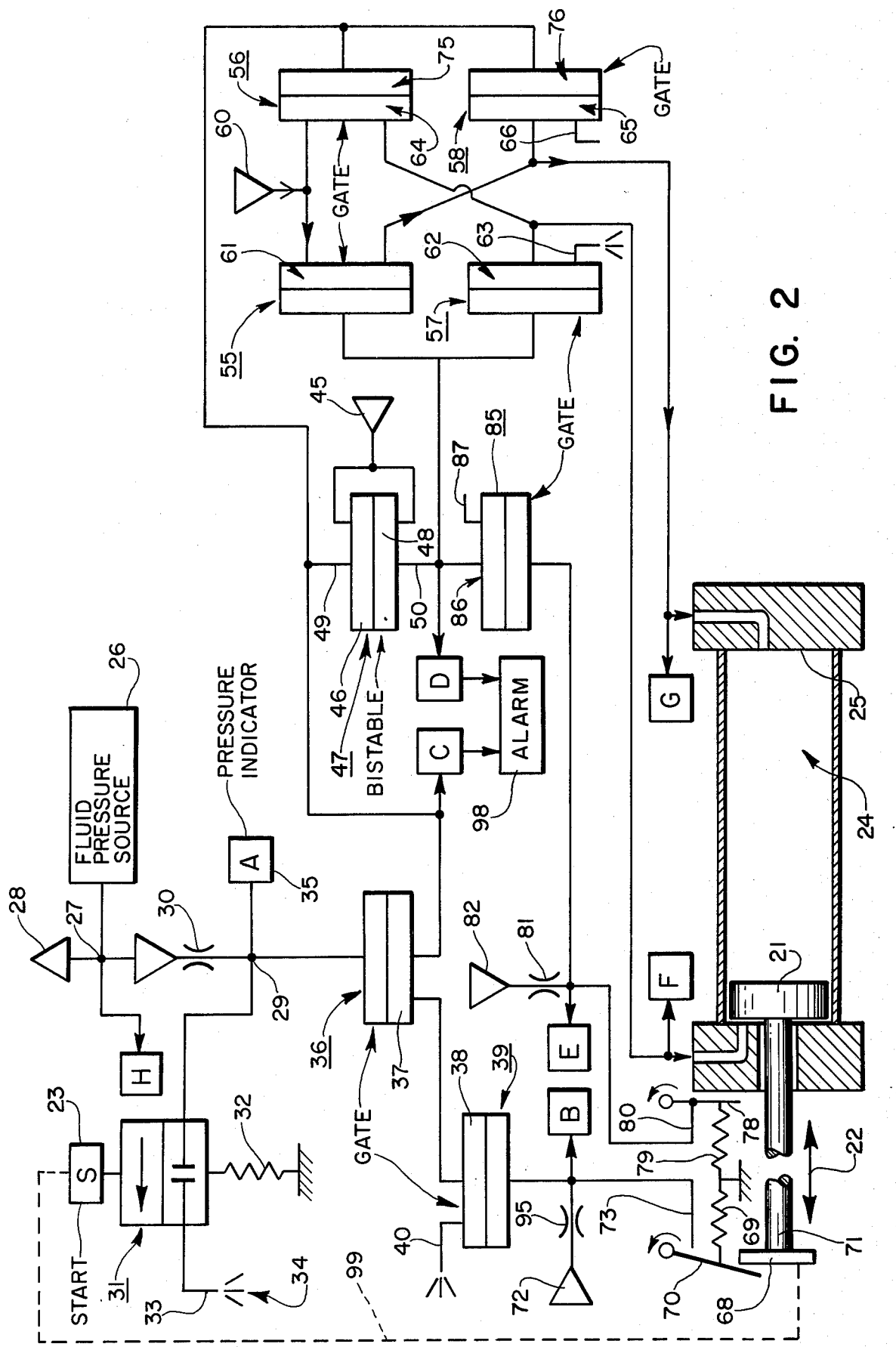
FIG. 2 is a schematic flow diagram of a multi-path fluid network and its associated logic control and diagnosis system operating a mechanism through a work cycle typically illustrating the control, logic and diagnostic features afforded by this invention.

FIG. 3 is a waveform chart illustrating the operation cycle of the embodiment of FIG. 2 by viewing the binary status of fluid pressure at corresponding lettered control points A–H in the flow network; and FIG. 4 is a chart illustrating the binary work indication of the flow network status at the various steps in the control cycle afforded by the embodiment of FIG. 2 and the corresponding binary operable diagnosis means for analyzing malfunctions in the system.

DESCRIPTION OF THE ILLUSTRATED EMBODIMENT - LOGIC ELEMENT

Figure 1A:
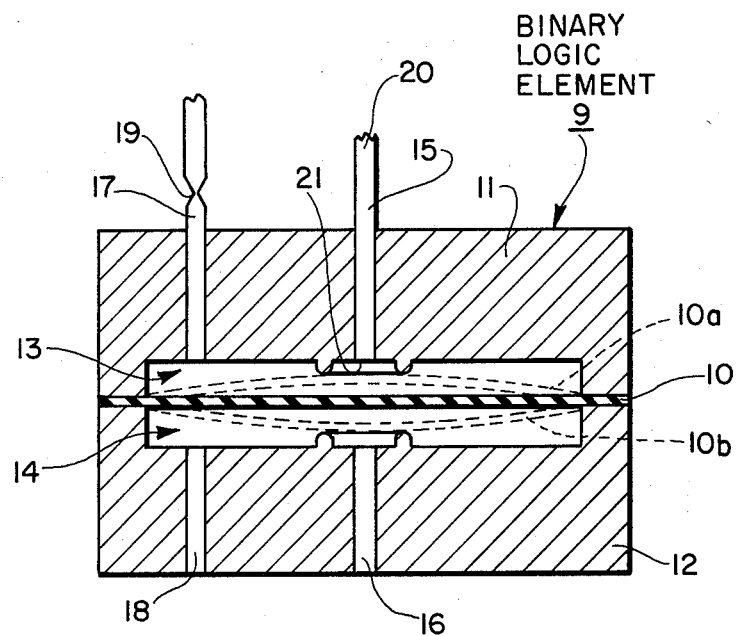
FIGS. 1a and 1b are respectively an elevation view in section and a schematic representation of the binary logic elements employed in this invention.
Figure 1B:
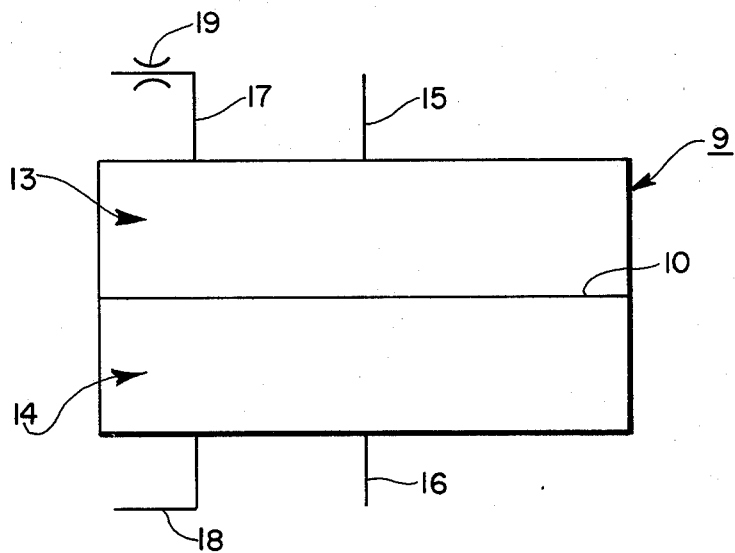

The basic fluid binary logic elements 9 employed in this invention are illustrated in FIG. 1. Copending applications of the same assignee hereto, Ser. No. 165,446 filed July 26, 1971, now Pat. No. 3,779,267; Ser. No. 165,447 filed July 26, 1971, now abandoned; Ser. No. 179,844 filed Sept. 13, 1971, now U.S. Pat. No. 3,789,864 and Ser. No. 186,845 filed Oct. 6, 1971, now U.S. Pat. No. 3,835,751, are directed to specific features of these logic elements. Basically as shown in FIG. 1a, the elements are constructed of a sandwich of a flexible diaphragm 10 between two hollow housing members 11 and 12 to form two separate fluid control chambers 13, 14 on opposite sides of diaphragm 10. FIG. 1b is a schematic repesentation of these logic elements 9. The diaphragm 10 can assume the central unflexed position with equal pressures in both chambers 13, 14 or may assume either of the phantom flexed positions 10A or 10B blocking respective passageways 15, 16 respectively depending upon the differential of pressures on opposite sides of the diaphragm such as in the two compartments 13, 14, or in the compartment 14 and the passageway 15 ending in the sub-compartment 21 closed by diaphragm position 10A. Auxiliary passageways 17, 18 may be provided for further control or gating functions. Thus, for example, an air supply through passageway 15 above atmospheric pressure may be vented to the atmosphere by passageway 17 to produce a substantially atmospheric pressure level in upper compartment 13. Because of the path restriction means or resistance device 19, the source supply at entrance 20 will remain at above atmospheric pressure. Because of this pressure level if the air supply source at above atmospheric were coupled simultaneously to inlet passageway 16 and passageway 18 were blocked or maintained above atmospheric, the pressure in chamber 14 would exceed that in chamber 13 and the diaphragm would flex to close passageway 15 by seating at position 21 even if the pressure of the source at 20 is equal to the pressure of the source at 16 because the area of the diaphragm affected by sub-compartment 21 is less than that of compartment 14.

The schematic diagram of FIG. 1b has corresponding elements shown schematically. It is to be understood that the device may be simplified by providing only part of the passageways in some applications, and may readily handle fluid under pressure of about 100 psi within a small compartment of the order of one-half inch in diameter and an eighth of an inch in depth.

THE CONTROL SYSTEM

As seen from FIG. 2 several of the above described logic elements are coupled in combination for providing an automatic control mode sequence of operations and for controlling at various key circuit points the fluid pressure and flow path configurations. The mechanically operable load device is a piston 21, which may drive a corresponding mechanism (not shown) as desired. This piston is caused by the logic control system to move through one cycle from the static rest position shown to complete a reciprocation cycle as suggested by the arrow 22. This cycle is started by a movable start lever 23, which may be mechanically or manually operated, and automatically sequences through a series of control steps retracting piston 21 toward the right within cylinder 24 until it reaches the opposite end 25 and then extending the piston back to the left to reach the rest or static position shown.

Power for operating the logic and the piston 21 is derived from fluid pressure source 26 supplying air for example at 100 psi (hereinafter designated 1 ) at outlet position 27. The schematic triangle 28 represents the connection of this source and pressure at other system positions, it being noted the present system may operate from a single source at a single pressure because pressure losses from element to element in the system interconnection are not incurred. When the source is vented, the pressure is maintained at the required pressure by reducing the loss loads. For example, the source 26 is connected to control position 29 through resistor restriction 30, so that if the control position 29 is vented to atmosphere by means of valve 31, the fluid pressure of source 26 is maintained without significant pressure loss at control point 27.

To start the cycle, the venting valve 31 is operated by means of momentarily actuated start lever 23, which may be spring biased by means 32 to return to normal position after actuation. The valve serves to vent control point 29 to atmosphere by passage 33 as suggested by the legend 34 momentarily while start lever 23 is depressed. Thus, the fluid at position 29 is lowered to atmospheric (hereinafter termed o). This action is referenced in the charts of FIGS. 3 and 4 for the indicator positions A, etc. Each of the blocks A, B, etc. as designated by the pressure indicator legend 35 comprise indicators providing a binary reading of the pressure levels 0, 1 at the corresponding control points (29–73). Other such referenced points and indicator devices are identified as C through H. The indicator may be of the type described in the copending application of this assignee, U.S. Ser. No. 289,578 filed Sept. 15, 1972 now U.S. Pat. No. 3,834,346 for example.

For reference, the positions of the control points A-H in the static rest condition shown are the initial levels of the diagrams of FIGS. 3 and 4, from which they change as the control operation sequences progress.

Continuing with the operation sequence in response to start lever 23, the high pressure state 1 at A is changed to 0 by the opening of vent 33 by operation of valve 31. This causes a differential pressure on the diaphragm in gate 36 and thus the pressure at point C goes from 1 to 0, being vented through chambers 37, 38 and vent 40.

Bistable element 47 has the source pressure maintained upon both compartments 46 and 48 by means of pressure source input point 45. However, when one outlet passageway 49 or 50 is vented or has the pressure lowered the differential pressure will cause the diaphragm to move to block one outlet 49 or 50 and maintain that position until a reversed pressure differential is established at passages 49, 50. Accordingly, side 50 (D) is maintained in static state position at a pressure opposite that of side 49 (C) as shown by the waveform transitions in FIG. 3.

The pressure levels C and D accordingly control power gates 55–58 which supply fluid flow paths from source inlet point 60 to operate the piston 21 at control points F, G, which are caused thereby to follow a similar state transition as bistable element 49 resulting in retracting and extending piston 21.

In the static condition shown before the start lever 23 is operated, the path of flud under pressure from source point 60 is through chamber 61 past indicator G and into cylinder 24 to maintain piston 21 at the extended position shown. The exhaust from cylinder 24 while the piston 21 is extending is vented past F and through chamber 62 to vent 63.

When the start lever 23 is operated and bistable element 47 changes state as C goes to 0 and D goes to 1 however, diaphragms in logic elements 55–58 change position and the flow of fluid under pressure from source position 60 reverses through chamber 64 and past indicator F to tend to move cylinder 21 through its retract stroke toward end 25, and correspondingly vents the cylinder 24 past G, and through chamber 65 and vent 66.

Each gate 55–58 operates similarly to open or close a fluid flow path through corresponding chambers 61, 62, 64 or 65 depending upon the condition of bistable element 47. As seen in the static condition of the circuit and cylinder 21 shown at the left of FIG. 3 and top of FIG. 4 therefore, with $C=1$ and $D=0$, differential pressure on diaphragms of elements 56 and 58 will close the flow through chambers 64 and 65. Conversely the low pressure condition (0) at line 50 and point D will permit the source 60 higher pressure (1) to move the diaphragm of elements 55 and open flow path chamber 61. Similarly, with $D=0$, the higher pressure of vented fluid past F on an extend stroke will change the diaphragm 62 in element 57 to open vent 63. Upon a change of state of bistable element 47 this procedure will reverse and switch elements 56 and 58 in a similar manner. This operational sequence serves therefore to control the stroke of piston 21 within cylinder 24 in either direction by reversing power delivery and venting past points F and G. Bistable memory logic element 47 then stores either the extend or retract condition until a further command is received changing the control step.

As the piston 21 moves away from its rest position, the mechanical position sensor switch valve 70 and vent 73 is closed by means of spring 69 when the switch detent bar 68 moves away with the piston rod 71 to move the switch lever counterclockwise as indicated by the arrow. In the static position before the piston 21 moves, source point 72 supplies fluid under pressure (1) and restriction resistor 95 permits point B to attain the vented atmospheric pressure 0 when vent 73 is open. Thus, in FIG. 3, the pressure at B changes state as the cylinder retracts from rest position.

The start lever 23 when released permits pressure at A to return to state 1 by closing valve 31.

The change of state B to 1 will cause the differential pressure on the diaphragm of gate element 39 to close chamber 38 and vent 40 to condition point C for a reversal of binary state of bistable element 47. A may be returned to 1 either before or after B is changed to 1. When A goes to 1 the flow path through chamber 37 of gate 36 is closed by the higher pressure on the diaphragm at point A since $C=0$.

Since the flow path lines connected to C have no inlet of fluid under pressure (1) when bistable element 47 is maintained with outlet 49 blocked, C remains at 0 until the bistable element 47 reverses its condition by opening compartment 48 to atmosphere, which permits pressure source 45 to open outlet 49 and close outlet 50.

As the retract piston stroke is completed, the position sensor valve switch 78 will be turned counterclockwise as the arrow shows against the bias of spring 79 to open vent 80 and cause E to go to 0, by operation of restriction resistor 81 reducing source point pressure 1 at 82 as the fluid flows through vent 80.

Since $D=1$ at this time, the diaphragm of gate 85 will shift to open chamber 86 and vent 87 causing D to go to 0. Because the side C at outlet 49 is no longer vented this creates a pressure differential switching bistable element 47 to send C back to 1 and reversing the piston drive power of source point 60 from F to G for an extend stroke, as before described. When the extend stroke starts, detent 68 moves away from vent switch 78 and vent 80 is closed again returning point E to 1. Since now $D=0$, this serves to close vent 87 in element 85 and condition position D so that the bistable element 47 can be again reversed under control of a pressure change at position C when start lever 23 is reinitiated.

The cycle is then completed and the static condition reinstated when the piston returns detent 68 to reopen switch 70 and vent 73 returning point B to 0. This opens vent 40 at gate 39 so that C may return to zero when the start lever 23 opens chamber 37 for the next operation cycle.

SUMMARY OF THE OPERATION CYCLE AND FLOW PATHS

The control system shown in FIG. 2 powered by fluid pressure source 26 automatically operates the piston 21 through one reciprocation cycle from the static position shown when start lever 23 is actuated to provide an initiating pulse. The operation sequence serves to change fluid flow paths and pressures at different points in the system with key control points labelled A-H and diagrammed in FIGS. 3 and 4 by means of an automatic pulse sequence occurring over the time period it takes for one piston retract-extend cycle.

In the static position fluid from source 26 is vented at vent 73 from fluid inlet 72 until the cycle is started. Since piston 21 is at the end of the stroke, no fluid is being vented past point F through chamber 62 and vent 63, nor is any fluid flowing into chamber 24 past G and chamber 61 from source point 60. Thus, power losses are slight because of resistor restriction 95 in the static condition.

When the start button is pushed fluid temporarily flows through restriction 30 and vent 33. This changes C to 0 and fluid flows from source point 45 past C and through chambers 37, 38 out vent 40.

Also, as C goes to 0, bistable 47 switches to start the cylinder retract stroke, taking fluid from source point 60 through chamber 64 and past point F until the end of the stroke. Near the end of the stroke detent 68 opens vent 80 to start the extend stroke logic functions. Vent 73 is closed when the piston moves away from its static position. Temporarily at the end of the stroke until the piston stroke is reversed to reclose switch 78 and vent 80 fluid is vented past E from source point 82 through vent 80. The effect of switch 78 is to cause a reversal of stroke by changing C to 1 and D to 0 and reversing the state of bistable element 47.

Upon the extend piston stroke, fluid from source point 60 flows past G and pushes piston 21 back through chamber 61 until the static position shown is attained.

As is noted by dotted line 99, the operation cycle may be made automatically repetitive and continuous by operating start lever 23 from the detent bar 68 of piston 21 or some other mechanism when it has returned to the end of the cycle position indicated by the opening of switch 70.

DIAGNOSIS INDICATORS

Because of binary operation afforded by the logic elements and the fluid pressure conditions each step of the control sequence may be identified in the form of a binary word as shown in FIG. 4, where each indicator A through H will identify the pressure state 1 or 0 occurring at that indicator position. Each indicator is located at a key control point in the system to thereby provide a maximum amount of information about system status and operation with only a few diagnosis indicators. Thus, the conditions at each gate or logic element need not be monitored but those at the different flow paths essential to operation and sequencing control of the system will be sufficient.

Accordingly, position A shows operation of the start control circuit, and any malfunction will be evident on pressure indicator A (35).

Indicator B shows whether or not piston 21 is fully extended.

Indicator C shows the status of the control circuits and gates 56, 58 operating the retract stroke of piston 21.

Indicator D shows the status of the control circuits and gates 55, 57 operating the extend stroke of piston 21.

Indicator E shows that the piston has attained a full retract stroke and that the extend control command is given.

Indicators F and G show the power status at the piston, and indicator H shows that the supply source 26 is operable.

From these indicators individually malfunctions of the various flow paths or control circuits may be analyzed at any step or if the system is locked up.

However, by supplying binary words of expected operating conditions and using a combination of indications, trouble points and the particular element causing malfunction may be pinpointed much more efficiently and effectively. This is particularly desirable when more complex control systems are used and accessibility of the circuits, elements or mechanisms is difficult, or when inoperative equipment must be quickly returned to operation.

In FIG. 4 the normal operating binary word for each normal control step is shown such as 10101011 for the static state in which the system resides as shown in FIG. 2. Thus, each step may be checked for normal operation.

To illustrate the manner of circuit diagnosis expedited by the diagnosis indicators, some of the possible malfunctions are illustrated in FIG. 4. Consider malfunction-1, for example with $ABC=111$. This illustrates use of a binary sub-word and any combination of the available indicators may be used for diagnosis. Smaller groups such as those shown lend themselves to provide simplified special alarm conditons. When diagnosing malfunctions several sorts of disorders may occur such as leaking flow paths, blocked flow paths or inoperative logic elements.

Malfunction-1, where $ABC=111$, would pinpoint improper operation of switch 70 or clogging of vent 73 in the static state condition. A matching template would identify the invalid words with a correction procedure such as shown for malfunction-1 to thereby direct relatively unskilled maintenance personnel quickly to the cause of the malfunction.

Consider then malfunction-2, where the condition $CD=11$ is unusual and not normally attained in operation. This would indicate the bistable element 47 probably has a broken, unflexed or leaky diaphragm. This might further lead to the auxiliary indication $FG=00$ meaning no power was supplied to cylinder 24.

Investigation of malfunction-3 would show $FG=11$ when bistable element 47 is properly operable with $C=1$. Thus, improper operation of gate 56 is indicated opening a fluid path through chamber 64.

These indications illustrate the powerful diagnosis mode offered in the system by provision of the binary operation control mode with indicators in a fluid operable system producing both logic and operation functions from common elements including power control. Troubleshooting is expedited in this manner by providing matching templates of malfunctions 1, 2, 3, etc., for matching predetermined indicator word patterns with indication thereon of the exact nature of service required under those conditions. This permits servicing of complex equipment by personnel with little training or troubleshooting expertise and thus provides a more efficient and improved control system combination than heretofore available.

The system also provides for simplified automatic alarm, shutdown or correction techniques, as for example in the case of $CD=11$ which can be easily sensed by conventional pressure sensitive switch means to sound an alarm 98 or set into effect a corrective procedure such as immediate shutdown of the system whenever the two conditions simultaneously coincide.

In general, the jamming of a mechanism preventing proper stroke of piston 21 might be sensed by a complete word structure 11011101 or 11101011 or 11100011 giving information for correcting mechanisms beyond the system shown by indicating the part of the stroke cycle in which the failure occurred.

SUMMARIZATION OF OPERATIONAL FEATURES

The control system afforded by this invention therefore provides for fluid control of utilization means such as indicators and pistons or other movable mechanisms from power obtained from a source of fluid under pressure. Fluid logic control elements are responsive to pressure differentials provided in the form of a sequence of temporary pulses derived from a logic system when initiated by a trigger pulse to thereby control and direct flow paths of the fluid under pressure in a flow network that controls the timing and working fluid pressures at the utilization means. The sequence control or logic network is intermixed with the flow network of this system and the flow network produces working power directly through and under the control of the same fluid logic elements that operate in the logic sequence. Thus the flexible diaphragm of the logic element shown in FIG. 1a, is controlled by instantaneous changes in fluid pressure differential on opposite sides of the diaphragm to attain different stable positions that thereafter are retained by the flow conditions in effect in the system until a further control pulse pressure differential is provided. Thus, very little power in terms of temporary pulses is needed to control the sequencing logic of flow paths which will in turn control delivery of significant power to load devices such as the piston of FIG. 2.

Considerable system logic flexibility is attained by timing of control fluid pressures to the logic elements as pulses of a known pulse sequence. Thus, an element may be prepared or primed by an event occurring at one time and the diaphragm flexed or switched at a later time in the control cycle. The gates provided in this invention function in the manner of either AND or OR logic gates depending upon the sequence of application of control pressures on either of the control input passageways on opposite sides of the diaphragm. Thus, the fluid logic elements respond to changes in applied pressures derived from fluid flow paths passing through other fluid logic elements, so that both logic functions and working fluid paths are intermixed in the control system network. The embodiment shown herein is respresentative of the nature of fluid actuated logic control systems afforded by the teachings of this invention, which utilize but are not confined to the particular preferred type of fluid logic element disclosed herein.

Having therefore in the foregoing specification, embodiments and drawings set forth the features, advantages and nature of the invention, those features of novelty representative of the nature and scope of the invention are set forth with particularity in the appended claims.

What is claimed is:

1. A digital fluid operable control system for automatically performing a series of at least three sequential logical functions in a predetermined control sequence in response to a single, temporary trigger pulse establishing a change of fluid pressure at a system trigger point, comprising in combination, a power source of fluid at a working pressure level, a plurality of fluid responsive binary logic elements each having structure attaining oposite states to control a flow path for fluid therethrough and structure causing a change of said states in response to temporary changes in fluid pressure between said working pressure level and a different pressure control level, said structure comprising a flexible diaphragn held between two fluid chambers so that it can assume a central unflexed position with equal pressures in both chambers or a flexed position toward either chamber with unequal pressures in the two chambers, means maintaining fluid at said different pressure control level;

fluid conveyance means coupling each logic element to said means maintaining fluid at said different pressure level, a network connecting said power source to said flow paths of each logic element for control of fluid flow thereto in response to the state of said elements, selectively operable trigger means coupled to trigger a single one of said elements identified as a trigger element for temporarily causing said change of pressure between said working pressure and said different pressure thereby to change the state of the trigger element, and a control network coupled from a flow path of said trigger element to at least a sequence of two further elements to change the pressure between said working pressure and different pressure therein to cause a change of state, thereby establishing a cyclic operational control sequence in said network in response to said temporary trigger pulse.

2. A system as defined in claim 1 including diagnostic means connected in said network for indicating the pressure status in binary form at a plurality of said points in said network at which a malfunction may be identified by an invalid combination of binary signals.

3. A system as defined in claim 1 wherein said trigger means is responsive to a pulse produced by reducing said working pressure momentarily thereby initiating said cyclic sequence for operation over a single control sequence and said network is connected for terminating said control sequence in a static condition awaiting a further similar cyclic sequence.

4. A digital fluid operable control system for automatically cycling through a sequential series of at least three control steps of an operation cycle in response to a single trigger pulse, comprising in combination, means providing fluid at two different pressures, a plurality of logical elements responsive to control pulses of fluid flow threreat changing between said two pressures to attain a specified state in response to said control pulses, a flow network connecting said logical elements to said means providing fluid to establish at least one controllable flow patth through a plurality of the elements, control means responsive to said control pulses of said fluid at predetermined sequentially actuated control positions influencing at said control steps the state of selected ones of said logic elements, a sequence control network responsive to said control means interconnecting said logical elements to cause changes of state of one element to produce a control pulse for another element thereby to produce an automatic control sequence cycle controlling the flow of fluid through said flow path for said sequential series of control steps and trigger means coupled to said fluid means to produce a temporary change between said two pressures providing a control pulse at a single one of said elements thereby to effect said control sequence in response to said single trigger input control pulse at one element.

5. A system as defined in claim 4 including diagnostic means comprising a plurality of indicators providing a binary visual display pattern, with means arranged to identify by matching at least one predetermined binary visual pattern indicative of a malfunction condition of said control sequence to identify thereby a correction routine.

6. A system as identified in claim 5 wherein the control system control sequence cycle passes through a plurality of sub-cycle control steps in said operation cycle, and said indicators have structure connected to respond to each sub-cycle control step thereby to produce a corresponding signal word combination for each step.

7. A system as defined by claim 5 including means identifying with a binary word combination produced by said indicators for a particular malfunction of said operation cycle a corrective routine for correcting the malfunction.

8. A system as defined in claim 4 wherein at least one logic device is a bistable element having two control input means and is constructed and connected in said network to respond to said pressure differential between said two control input means from the fluid at the two different pressure to thereby establish said flow path through the logic device, and to maintain said flow path until a pressure differential of opposite sense is established at the two control input control means by reversing the pressures of said fluid at said two different pressures at said two control input means.

9. A system as defined in claim 4 wherein at least one said logic element is a binary memory device connected in said network for retaining one of two states until changed by a control signal pulse comprising a change of fluid pressures thereto provided by logic steps in said sequence control network.

10. A system as defined in claim 4 wherein the trigger means is connected to control a single said logic element with an output fluid flow path therethrough that changes the fluid pressure from one to the other of said two pressure levels in response to a temporary control pulse input pressure condition established by a change between the two pressure levels.

11. A digital fluid operable control system for automatically cycling through a series of control steps of an operation cycle, comprising in combination, means providing fluid at two different pressures, a plurality of logical elements responsive to control pulses of fluid flow therethrough changing between said two pressures to attain a specified state in response to said control pulses, a flow network connecting said logical elements to said means providing fluid to establish at least one controllable flow path through a plurality of the elements, control means responsive to said control pulses of said fluid at predetermined control positions influencing the state of selected ones of said logic elements, a sequence control network responsive to said control means interconnecting said logical elements to cause changes of state of one element to produce a control pulse for another element thereby to produce an automatic control sequence cycle controlling the flow of fluid through said flow path and trigger means coupled to said fluid means to produce a temporary change between said two pressures providing a control pulse at a single one of said elements thereby to effect said control sequence in response to a single trigger input control pulse at one element, wherein a plurality of said logic elements have connected thereto indicators identifying the one of said two pressure conditions established at a flow path controlled by said logic element, including means identifying an invalid combination of pressures at said indicators and the nature of system malfunctions establishing the invalid combination.

12. A fluid flow system diagnostic apparatus for determining operating conditions in a cyclically operable multiple path fluid flow network, comprising in combination, means providing fluid at two different pressures, means connecting said cyclically operable multiple fluid control network to said means for providing said fluid, fluid control means in said path responsive to changes from one to the other of said two pressures at predetermined control points to thereby establish different fluid flow patterns through the paths in said network, and a plurality of binary fluid pressure responsive devices indicating one of said two pressure levels connected to said flow network at said control points to produce a combination of binary signals representative of the status of fluid flow through said network including means identifying a combination of said binary signals indicating a particular condition of the system.

13. A system as defined in claim 12 wherein said fluid control means comprises a plurality of binary logic devices each having a fluid flow path therethrough and two fluid inputs connected to said system responsive to pressure changes at said two inputs to selectively control said fluid flow path in response to said two fluid inputs.

14. A system as defined in claim 12 wherein said fluid control means comprises a plurality of fluid actuated logic fluid control devices coupled in said network for controlling the flow paths and pressures at said control points.

15. A system as defined in claim 14 wherein at least some of said control devices are connected together to provide a cyclically operable automatic control sequence in said system.

16. A system as defined in claim 15 wherein said automatic control sequence is connected to establish one complete cycle and retain the system in a static rest condition, and including a selectively operable fluid control logic device for initiating said system through said automatic control sequence from said static condition.

17. A system as defined in claim 12 including means operable from said identified combination of binary signals to effect a control function in said system.

18. A system as defined in claim 12 comprising a display panel incorporating a plurality of said pressure response devices to provide side by side responses displayed in the form of binary words.

19. A system as defined in claim 12 wherein said binary pressure response devices provide an indication of a pressure condition at two different states and third condition between said two states.

20. A digital fluid operable control system providing an operation cycle, comprising in combination, a source of fluid such as air at a working pressure above atmospheric, a flow network conveying said fluid from said source to a plurality of flow control points, a plurality of gating elements in said network gating said fluid from said source to produce control pulses at both said working pressure and at atmospheric control pressure, a plurality of fluid operated binary logic control elements connected in a control network for processing said control pulses to produce therefrom an operation cycle sequence of at least three steps changing the state of selected ones of said gating elements and including said gating elements connected to said source to provide as a source of operational power fluid at said working pressure to said flow control points under control of the logic elements, said control network comprising a network of fluid flow paths including said logic control elements connected therein to produce responsive to the logic control elements an automatically changing pattern sequence of at least three different fluid flow path conditions in said network thereby conveying said fluid under working pressure from said source to said plurality of predetermined flow control points in said network at which said pressure is at either said control pressure or said working pressure.

21. A fluid control system as defined in claim 20 comprising in combination, a plurality of individual fluid pressure responsive indicators monitoring each of said plurality of predetermined flow control points in said flow network simultaneously to produce a set of signal combinations indicative of the operational status of said system.

22. A system as defined in claim 21 wherein the indicators each identify one of said working or control pressure levels appearing at said positions and said plurality of said indicators in combination thereby provides a digital word pattern representation of said operational status.

23. A logic control system providing an automatic control sequence comprising in combination, a plurality of fluid operated logic elements each having two input means for connection to at least one fluid source, means selectively providing fluid to said two input means of each element, fluid path control means including a fluid path controlled by each of said logic elements to respond to a change of fluid pressure at said two input means to selectively control the flow of fluid through said path, and a network operating the fluid path control means in a sequential series of at least two of said fluid logic elements in response to said fluid flow path of another fluid logic element as said means selectively providing fluid thereto to thereby establish an automatic sequence pattern of flow path controls which progresses through at least three states of flow conditions through said network with said fluid flow paths thereby effecting logic control functions in said system.

24. A system as defined in claim 23 wherein at least one of said logic elements is a bistable memory element constructed with two opposing pressure chambers having connected respectively thereto said two input means to thereby respond to said change of pressure acting in said two chambers in the form of a temporarily applied pressure pulse signal and having structure to retain one of two corresponding stable logic positions in response to the sense of the change of pressure with a steady state condition while substantially equal pressure of fluid is applied to said two opposing pressure chambers, means in said system providing fluid at substantially equal pressure to said two opposing pressure chambers of said memory element, and means providing a pulse signal at one of said inputs to change the pressure in one of said chambers to effect a change of the memory state thereof, resulting in a change of control of said fluid path.

* * * * *